June 11, 1963 C. I. PLACE 3,093,012
POWER TRANSMISSION
Filed Feb. 17, 1961 2 Sheets-Sheet 2
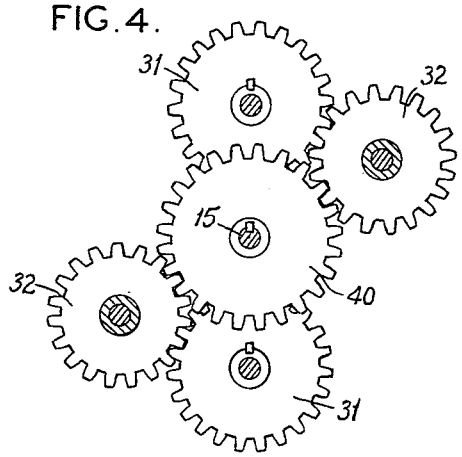
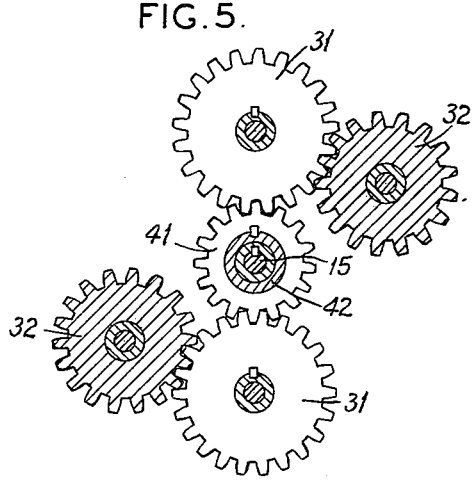
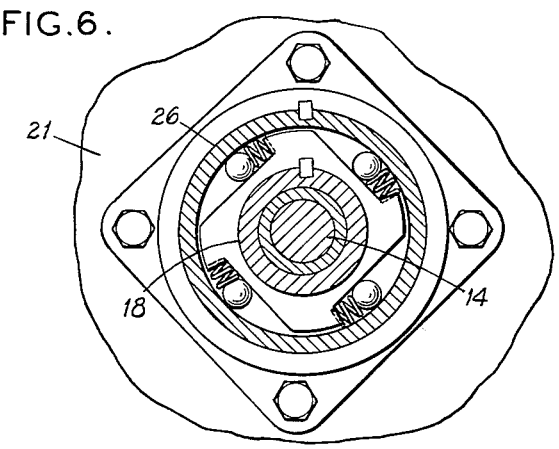
INVENTOR.
CHARLES I. PLACE
BY Cohn and Powell
ATTORNEYS

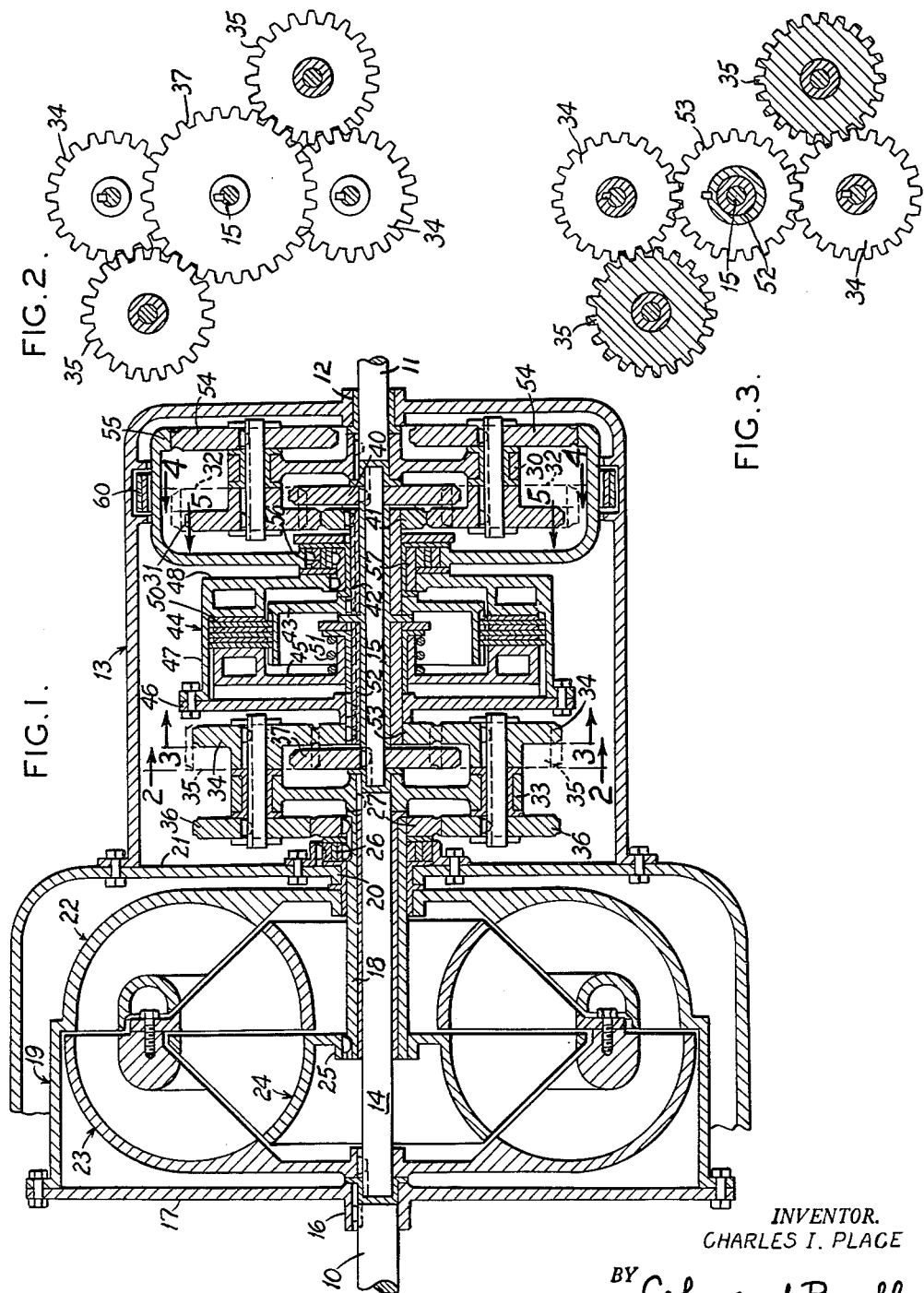

United States Patent Office 3,093,012
Patented June 11, 1963

3,093,012
POWER TRANSMISSION
Charles I. Place, R.F.D. 4, McDonald Road,
Colchester, Conn.
Filed Feb. 17, 1961, Ser. No. 90,019
16 Claims. (Cl. 74—677)

This invention relates generally to improvements in a power transmission, and more particularly to a turbo-mechanical transmission that is fully automatic and which provides variable speeds in one progressive and stepless range.

This application is a continuation-in-part of application Serial No. 778,762, now abandoned, filed December 8, 1958 and entitled "Power Transmission."

It is an important objective of this invention to provide an automatic transmission that is adapted for use in many fields, but is particularly adapted for use in automotive vehicles.

An important objective is realized by the transmission in that multiple torque is provided at all speeds from zero to direct drive in both the forward and reverse range.

Briefly, the transmission consists in the main of a fluid unit in combination with differential gearing. The reactor member of the fluid unit, when such is acting as a torque converter, is the actuating element in the production of multiple torque. When the fluid unit acts as a fluid coupling, the reaction of the fluid against the reactor member is negligible and the transmission produces direct drive.

An important object is realized in interconnecting the reactor member and the drive member of the fluid unit with elements of the differential gearing so that the rate of discharge of fluid from the driven member to the reactor member in combination with the load on the output shaft determines the rate of torque produced.

Another important object realized, is the development of a speed-and-torque drive that balances the power input and the load imposed on the transmission, the transmission automatically establishing a drive balance appropriate to changed conditions. It will be noted that multiple torque drive obtains automatically in all speeds when the demand occurs. Any unbalance between torque input and torque demand will automatically cause the production of multiple torque in the transmission system.

Still another important object is realized in that the transmission is so designed that the prime mover, when decelerated, acts as a brake to slow down the movement of the load on the output shaft.

Yet another important object is realized in providing a stepless transmission in which no controls are needed other than those necessary to cause the transition from neutral to forward drive and from neutral to reverse drive and vice versa.

The foregoing and numerous other objects and advantages of the invention will more clearly appear from the following detailed description of a preferred embodiment, particularly when considered in connection with the accompanying drawing, in which:

FIG. 1 is a longitudinal sectional elevation of the improved transmission, in which various planet gears are shown in phantom or broken lines rotated to a vertical position to more clearly illustrate the operation and connection of such planet gears;

FIG. 2 is a view partially in cross section of the differential gearing as seen along line 2—2 of FIG. 1;

FIG. 3 is a view partially in cross section of the differential gearing as seen along line 3—3 of FIG. 1;

FIG. 4 is a view partially in cross section of the differential gearing as seen along line 4—4 in FIG. 1;

FIG. 5 is a view partially in cross section of the differential gearing as seen along line 5—5 of FIG. 1, and FIG. 6 is an enlarged view partially in cross section of the one-way brake operatively connected to the reactor member of the fluid unit.

Referring now by characters of reference to the drawing, the improved transmission includes a driving or power input shaft 10, a driven or power output shaft 11, a fluid unit generally indicated at 19, and differential gearing, hereinafter described, interconnecting the input and output shafts. In the preferred arrangement, the shafts 10 and 11 are disposed in substantially axial alignment. The input shaft 10 is journalled in the prime mover (not shown). The output shaft 11 is journalled in the flange 12 of case 13 and is attached to the load (not shown).

Located axially between input and output shafts 10 and 11, and extending centrally of the transmission assembly are the shafts 14 and 15.

The shaft 14 is journalled at its forward end in the hub 16 of the flywheel 17. The flywheel 17 is secured by a key to the input shaft 10. The shaft 14 is journalled at its rearward end in the sleeve 18, the sleeve 18 being in turn journalled in the flange 20 of the case member 21.

The fluid unit 19 may be of well known type suitable to the present transmission, the fluid unit comprising a driving member referred to at 22, a driven member referred to at 23, and a reactor member referred to at 24.

The reactor member 24 includes a hub 25 secured by key to the sleeve 18. A one-way brake 26 such as the type shown in FIG. 6, is secured by key to the sleeve 18. In addition, a sun gear 27 is secured by a key to the sleeve 18.

Drivingly attached by a key to driven shaft 11 is a planet carrier 30 on which is carried a set of planet gears 31. Another set of planet gears 32 of greater thickness than planet gears 31, is carried also by the planet carrier 30. As is best shown in FIG. 5, each of the planet gears 31 intermeshes with one of the planet gears 32.

Another planet carrier 33 is drivingly attached by a key to the shaft 14. A set of planet gears 34 is carried by the carrier 33. Another set of planet gears 35 of greater thickness than planet gears 34 is carried also by the planet carrier 33. As is best seen in FIG. 3, each of the planet gears 34 intermeshes with one of the planet gears 35.

In FIG. 1, the planet gears 32 on carrier 30 and the planet gears 35 on carrier 33 are illustrated in phantom or broken lines as being rotated to a vertical position in order to more clearly illustrate the structure and operation. FIGS. 2 and 4 illustrate respectively the accurate location and arrangement of the planet gears 32 and 35 relative to the carrier and to the respective cooperating planet gears 31 and 34.

A third set of planet gears is carried by the planet carrier 33, the planet gears 36 being drivingly attached by keys to the same shaft with planet gears 34 so as to be rotatable therewith. The planet gears 36 mesh with the sun gear 27, and hence are drivingly connected to the reactor member 24.

The forward end of shaft 15 is journalled in the hub of planet carrier 33. The rearward end of shaft 15 is journalled in the hub of planet carrier 30. A sun gear 37 is attached by key to shaft 15 and is arranged to mesh with the planet gears 35. Another sun gear 40 is drivingly attached by a key to shaft 15 and is arranged to mesh with the planet gears 32 rotatively mounted on carrier 30. The sun gears 37 and 40 and their connecting shaft 15 represent a gear train operatively interconnecting the planet gears 32 on carrier 30 with the planet gears 35 on carrier 33.

Means are provided which selectively interconnect the planet gears 31 with the planet gears 34. This means includes a sun gear 41 drivingly attached to a sleeve 42 and meshing with planet gears 31. It should be clearly understood from FIG. 5 that sun gear 41 meshes with the planet gears 31 and not with the planet gears 32. Secured to sleeve 42 is a clutch member 43. Similarly, it should be understood from FIG. 4 that sun gear 40 meshes with planet gears 32 and not with planet gears 31.

The operating clutch 44 can be of the type disclosed in the 1955 issue of Motors Auto Repair Manual, pages 413 and 414, published by the Automatic Business Magazine: Motor, 250 West 55th Street, New York 19, New York (18th edition). Clearly this publication shows a one-way brake and a hydraulically operated clutch that can be used in the present environment for elements 26, 56 and 44.

The operating clutch generally shown at 44 consists of usual members such as a hydraulic piston member 45, a casing structure 46—47—48, the usual type of clutch plates 50, and clutch release spring 51. In this preferred presentation a typical hydraulically operated clutch has been shown but the operating controls have been omitted.

The clutch member 46 is drivingly connected by a key to a bearing 52, journalled on shaft 15. A sun gear 53 is drivingly attached by a key to the bearing 52, the sun gear 53 meshing with the planet gears 34 on planet carrier 33. From FIG. 3, it is clear that sun gear 53 meshes with planet gears 34 and not with planet gears 35. Similarly, it should be clearly understood from FIG. 2 that the sun gear 37 meshes with the planet gears 35 and not with the planet gear 34.

A third set of planet gears 54 is carried by planet carrier 30, each planet gear 54 being drivingly attached to the same shaft with one of the planet gears 31 so as to be rotatable therewith. Meshing with the planet gears 54 is a ring gear 55 that has its hub secured by a key to one member of a one-way brake 56 similar to the type shown in FIG. 6. The other member of one-way brake 56 is keyed to a sleeve 57 journalled on sleeve 42. Fixed to sleeve 57 by a key is clutch member 48.

A brake band 60 is provided to engage the ring gear 55 so as to prevent selectively the ring gear 55 from rotating. The mechanism for operating the brake band 60 is not shown.

It is thought that the operation and functional advantages of the transmission have become fully apparent from the foregoing description of parts, but for completeness of disclosure, the operation of the automatic transmission will be described under forward and reverse conditions.

First, assume that the prime mover is rotating the input shaft 10 at idling speed, that the fluid unit 19 is filled with fluid, that the operating clutch 44 is open, that the brake band 60 is inoperative and that a load is on the output shaft 11. Under these conditions, the transmission is in neutral position and the load on the output shaft 11 will not be moved.

Under the same conditions as described above except only that the operating clutch 44 is closed so as to unite the sleeves 42 and 52 and hence cause the sun gears 41 and 53 to rotate as a unit, the transmision is in drive position. However, because the prime mover is being operated at idling speed, thus rotating the input shaft 10 and its attached parts including the drive member 22 at idling speed, the discharge of fluid from the blades of the driving member 22 will not be of sufficient force to rotate the driven member 23 which is now under load.

Now if the prime mover is speeded up, thus increasing the rotation of the input shaft 10 and its attached drive member 22, the discharge of fluid from the blades of the drive member 22 against the blades of the driven member 23 will drive said member 23 and its attached parts including the shaft 14 and the planet carrier 33 together with its rotatably supported planet gears 34—35—36 in a forward direction. At the same time, fluid from the blades of the driven member 23 is discharged against the blades of the reactor member 24 of the fluid unit, thus tending to cause the reactor member 24 and its attached parts including the sleeve 18 and the sun gear 27, to be forced in a reverse direction to the forward movement of the driven member 23. However, the reactor member 24 and its attached parts including the sun gear 27 is withheld from reverse rotation by the one-way brake 26. It will be particularly noted that at this stage of the operation, the sun gear 27 is held stationary by the force of the discharge fluid from driven member 23 driving the reactor member 24 and its attached parts against the one-way brake member 26 secured to the case plate 21.

Simultaneously with the above action, the driven member 23 of the fluid unit is rotating its attached planet carrier 33 forwardly, thus causing the planet gears 36 to walk around the stationary sun gear 27. Because planet gears 36 and 34 are secured to the same shaft, such planet gears 36 and 34 will rotate together, thus causing the sun gear 53 to remain stationary, or to rotate with sun gear 27. It will be noted that sun gears 27 and sun gears 53 are of the same dimension.

As explained previously, planet gears 34 are in mesh with planet gears 35 and hence cause reverse rotation of planet gears 35. Planet gears 35 mesh with the sun gear 37 and hence cause forward rotation of sun gear 37. By this arrangement, the planet gears 34 and the sun gear 37 rotate in a forward direction.

The forward rotation of sun gear 37 rotates the shaft 15 and its attached sun gear 40 forwardly also. It has already been shown that sun gear 41 is held at rest because it is directly connected by clutch 44 to sun gear 53 that is stationary. The forward rotation of sun gear 40 will rotate the planet gears 32 reversely. Because planet gears 32 mesh with planet gears 31, planet gears 31 will be rotated forwardly or in the same direction as sun gear 40. The planet gears 31 walk around the now stationary sun gear 41 and carry the planet carrier 30 and its attached parts including the output shaft 11.

The initial drive of output shaft 11 by the acceleration of the drive of the input shaft 10 has now been described, whereby the inertia of the load on shaft 11 is overcome and the movement of such load is caused. Now as inertia is overcome and momentum attained, the initial load is reduced and the force of the discharge of fluid from the blades of drive member 22 to the blades of the driven member 23 of the fluid unit will more effectively propel such driven member 23 to the point where both drive and driven members 22 and 23 of the fluid unit tend to rotate together, thus transforming the unit from a torque converter to a fluid coupling. As this action takes place, there is a lessening of force of fluid discharged from the driven member 23 against the reactor member 24 until such discharge is negligible and the reactor member 24 floats with the driven member 23, thus freeing the reactor member 24 and its attached parts. Under these conditions, the sun gear 27 ceases its control over the action of planet gears 36.

At this last described stage of the operation, the driven member 23 of the fluid unit 19 and the attached parts of reactor member 24 including the planet carrier 33 are driven at approximately prime mover speed by the force of the fluid discharged from the blades of the drive member 22. The full drive of the planet carrier 33 and its rotatively supported planet gears 34—35—36, and the fact that the one set 34 works against the other set 35, tend to drive the sun gears 37 and 53 and their attached parts including the sun gears 40 and 41, as a unit. This unit drive in turn drives the planet gears 31 and 32 of the planet carrier 30, together with the carrier itself and its attached output shaft 11 as a unit. Thus, the transmission is in full direct forward drive.

To attain reverse drive from a neutral position, clutch 44 is opened and brake band 60 is actuated to cause restraint of the ring gear 55. It will be noted that there is located between the hub of ring gear 55 and the sleeve 57, a one-way brake 56 operable to restrain sleeve 57 from forward rotation when the ring gear 55 is restrained. It is apparent that the clutch case 46—47—48 attached to sleeve 57 is restrained also from forward rotation. This restraint is continued through the sleeve 52, the sun gear 53, through the planet gears 34–36 to the sun gear 27 and on to the reactor member 24 of the fluid unit 19.

The reason for the above described restraining action is a precautionary measure to make sure that sun gear 27 remains stationary, thus permitting the rotation of sun gear 40 to drive planet gears 32 reversely.

Under these conditions, the planet gears 35 are driven reversely by planet gears 34 as the planet carrier 33 is turned forwardly by the driven member 23. Because the planet gears 35 mesh with sun gear 37, such sun gear 37 is driven forwardly, and consequently sun gear 40 is driven forwardly. The forward drive of sun gear 40 causes the reverse rotation of planet gears 32 meshing therewith. Because the planet gears 32 mesh with planet gears 31, such planet gears 31 and cooperating planet gears 54 are driven in a forward direction. The planet gears 54 walk inside the ring gear 55 that is held stationary by the brake band 60, and hence the planet gears 54 carry the planet carrier 30 and its attached output shaft 11 reversely. It will be noted that with the operating clutch 44 open, the clutch member 43 and its attached parts represented by sleeve 42 and sun gear 41, are free to rotate.

Although the invention has been described by making detailed reference to a single preferred embodiment, such detail is to be understood in an instructive, rather than in any restrictive sense, many variants being possible within the scope of the claims hereunto appended.

I claim as my invention:

1. A transmission interconnecting driving and driven shafts comprising a fluid unit having driving, driven and reactor members, an operative connection between said driving shaft and said driving member, a differential gearing providing a first planet carrier drive connected to said driven shaft, a first and a second set of intermeshing planet gears carried by said first planet carrier, a second planet carrier drive connected to said fluid driven member, a first and a second set of intermeshing planet gears carried by said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, means operatively interconnecting the said first set of planet gears on said first and second planet carriers, and a gear train operatively connecting the said second set of planet gears on said first and second planet carriers.

2. A transmission interconneecting driving and driven shafts comprising a fluid unit having driving, driven and reactor members, an operative connection between said driving shaft and said driving member, a differential gearing providing a planet carrier drive connected to said driven shaft, another planet carrier drive connected to said fluid driven member, two sets of planet gears on each of said carriers, a planet gear of one set intermeshing with a planet gear of the other set, a gear element drive connected to said reactor member and operatively drive connected to one set of planet gears on the said carrier connected to the driven member, a one-way brake operatively connected to said reactor member to prevent rotation of said reactor member and said gear element in one direction, a gear train operatively connecting one set of gears on one carrier to one set of gears on the other carrier, another gear train operatively connecting the other said set of gears on one carrier to the other said set of gears on the other carrier, and means in one of said gear trains for selectively disconnecting the associated one set of planet gears on one said carrier from the associated one set of planet gears on the other said carrier.

3. A transmission interconnecting driving and driven shafts comprising a fluid unit having driving, driven and reactor members, an operative connection between said driving shaft and said driving member, a differential gearing providing a first planet carrier drive connected to said driven shaft, a first and a second set of planet gears carried by said planet carrier, the planet gears of one set intermeshing with the planet gears of the second set, a second planet carrier drive connected to said fluid driven member, a first and a second set of planet gears carried by said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, the planet gears of the first set intermeshing with the gears of the second set of said second carrier, means operatively interconnecting the said first sets of planet gears on said first and second planet carriers, and a gear train operatively connecting the said second sets of planet gears on the said first and second planet carriers.

4. A transmission interconnecting driving and driven shafts comprising a fluid unit having driving, driven and reactor members, an operative connection between said driving shaft and said driving member, a differential gearing providing a first planet carrier drive connected to said driven shaft, a first and a second set of planet gears intermeshing and carried by said first planet carrier, a second planet carrier drive connected to said fluid driven member, a first and a second set of said planet gears intermeshing and carried by said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, means operatively interconnecting the said first sets of planet gears on said first and second planet carriers, a sun gear meshing with the said second set of planet gears on the said first planet carrier, another sun gear meshing with the said second set of planet gears on the said second planet carrier, and means drive connecting the last said two sun gears.

5. A transmission interconnecting driving and driven shafts comprising a fluid unit having driving, driven and reactor members, an operative connection between said driving shaft and said driving member, a differential gearing providing a first planet carrier drive connected to said driven shaft, a first and a second set of planet gears intermeshing and carried by said first planet carrier, a second planet carrier drive connected to said fluid driven member, a first and a second set of planet gears intermeshing and carried by said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, a sun gear meshing with the said first set of planet gears on said first planet carrier, another sun gear meshing with the said first set of planet gears on said second planet carrier, means selectively drive connecting the last said two sun gears, and a gear train operatively connecting the said second set of planet gears on said first and second planet carriers.

6. A transmission interconnecting driving and driven shafts comprising a fluid unit having driving, driven and reactor members, an operative connection between said driving shaft and said driving member, a differential gearing providing a first planet carrier drive connected to said driven shaft, a first and a second set of planet gears intermeshing and carried by said first planet carrier, a second planet carrier drive connected to said fluid driven member, a first and a second set of planet gears intermeshing and carried by said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, a first sun gear meshing with the said first set of planet gears on said first planet carrier, a second sun gear meshing with the said first set of planet gears on said second planet carirer, means selectively drive connecting said first and second sun gears, a third sun gear meshing with the said second set of planet gears on the said first planet carrier, a fourth sun gear meshing with the said second set of planet gears on the said second planet carrier, and means drive connecting said third and fourth sun gears.

7. A transmission interconnecting driving and driven shafts comprising a fluid unit having a driving member, a driven member and a reactor member, an operative connection between said driving shaft and said driving member, a differential gearing including a first planet carrier drive connected to said driven shaft, a first and a second set of planet gears intermeshing and carried by said first planet carrier, a second planet carrier drive connected to said fluid driven member, a first and a second set of planet gears intermeshing and carried by said second planet carrier, means selectively drivingly interconnecting said first sets of planet gears of the said first and second planet carrier, a gear train operatively interconnecting the said second sets of planet gears of the said first and second planet carriers, a third set of planet gears attached to and rotatable with the said first set of planet gears on said second planet carrier, a gear element drive connected to said fluid reactor member and meshing with said third set of planet gears, and a one-way brake operatively connected to said reactor member to prevent rotation of said reactor member in one direction.

8. A transmission interconnecting driving and driven shafts comprising a fluid unit having driving, driven and reactor members, an operative connection between said driving shaft and said fluid driving member, a differential gearing including a first planet carrier drive connected to said driven shaft, a first and a second set of planet gears intermeshing and carried by said first planet carrier, a second planet carrier drive connected to said fluid driven member, a first and a second set of planet gears intermeshing and carried by said second planet carrier, means selectively drivingly interconnecting said first sets of planet gears of the said first and second planet carriers, a sun gear meshing with the said second set of planet gears on the said first planet carrier, another sun gear meshing with the said second set of planet gears on the said second planet carrier, means drive connecting said sun gears, a third set of planet gears attached to and rotatable with the said first set of planet gears on said second planet carrier, a gear element drive connected to said fluid reactor member and meshing with the said third set of planet gears, and a one-way brake operatively connected to said reactor member to prevent rotation of the reactor member in one direction.

9. A transmission interconnecting driving and driven shafts comprising a fluid unit having driving, driven and reactor members, an operative connection between said driving shaft and said driving member, a differential gearing including a first planet carrier drive connected to said driven shaft, a first and a second set of planet gears intermeshing and carried by said first planet carrier, a second planet carrier drive connected to said fluid driven member, a first and a second set of planet gears intermeshing and carried by said second planet carrier, a sun gear meshing with the first set of planet gears on said first planet carrier, another sun gear meshing with the said first set of planet gears on said second planet carrier, means selectively drive connecting said sun gears, a gear train operatively interconnecting the said second sets of planet gears of the said first and second planet carriers, a third set of planet gears attached to and rotatable with the said first set of planet gears on said second planet carrier, a gear element drive connected to said fluid reactor member and meshing with said third set of planet gears, and a one-way brake operatively connected to said reactor member to prevent rotation of said reactor member in one direction.

10. A transmission interconnecting driving and driven shafts comprising a fluid unit having driving, driven and reactor members, an operative connection between said driving shaft and said fluid driving member, a differential gearing including a first planet carrier drive connected to said driven shaft, a first and a second set of planet gears intermeshing and carried by said first planet carrier, a second planet carrier drive connected to said fluid driven member, a first and a second set of planet gears intermeshing and carried by said second planet carrier, a first sun gear meshing with the said first set of planet gears on said first planet carrier, a second sun gear meshing with the said first set of planet gears on said second planet carrier, means selectively drive connecting said first and second sun gears, a third sun gear meshing with the said second set of planet gears on the said first planet carrier, a fourth sun gear meshing with the said second set of planet gears on the said second planet carrier, means drive connecting said third and fourth sun gears, a third set of planet gears attached to and rotatable with the said first set of planet gears on said second planet carrier, a gear element drive connected to said fluid reactor member and meshing with said third set of planet gears, and a one-way brake operatively connected to said reactor member to prevent rotation of said reactor member in one direction.

11. A transmission interconnecting driving and driven shafts comprising a fluid unit having driving, driven and reactor members, an operative connection between said driving shaft and said driving member, a differential gearing providing a first planet carrier drivingly attached to said driven shaft, a first and a second set of planet gears intermeshing and carried on said first planet carrier, a second planet carrier drivingly attached to said fluid driven member, a first and a second set of planet gears intermeshing and carried on said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, sun gears meshing with the said first set of planet gears on each of said carriers, a clutch means operatively interconnecting said sun gears, and a gear train including sun gears meshing with the said second set of planet gears on each of said planet carriers.

12. A transmission interconnecting driving and driven shafts comprising a fluid unit having driving, driven and reactor members, an operative connection between said driving shaft and said fluid driving member, a differential gearing providing a first planet carrier drivingly attached to said driven shaft, a first and a second set of planet gears intermeshing and carried on said first planet carrier, a second planet carrier drivingly attached to said fluid driven member, a first and a second set of planet gears intermeshing and carried on said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, a gear train drivingly interconnecting the said second set of planet gears on said first and second planet carriers, a third set of planet gears attached to and rotatable with said first set of planet gears on said first planet carrier, a ring gear meshing with said third set of planet gears, a second sun gear meshing with the said first set of planet gears on said first carrier, means connecting the ring gear to the said second sun gear, means selectively drivingly connecting the said second sun gear with the first set of planet gears on said second planet carrier and selectively permitting free rotation of the said second sun gear, and braking means selectively engaging the ring gear to prevent rotation of said ring gear and said second sun gear.

13. A transmission interconnecting driving and driven shafts comprising a fluid unit having driving, driven and reactor members, an operative connection between said driving shaft and said fluid driving member, a differential gearing providing a first planet carrier drivingly attached to said driven shaft, a first and a second set of planet gears intermeshing and carried on said first planet carrier, a second planet carrier drivingly attached to said fluid driven member, the first and the second set of planet gears intermeshing and carried on said second planet carrier, a third set of planet gears attached to and rotatable with the first set of planet gears on said second carrier, a sun gear drivingly attached to said reactor member and meshing with the third set of planet gears on said second carrier, and a one-way brake operatively connected to said reactor member to prevent rotation of said reactor member in one direction, a gear train drivingly interconnecting the said second sets of planet gears on said first and second carriers, a sun gear meshing with the said first set of planet gears on the said first carrier, another sun gear meshing with the first set of planet gears on said second carrier, clutch means selectively connecting the last said two sun gears, a third set of planet gears attached to and rotatable with said first set of planet gears on said first carrier, a ring gear meshing with said third set of planet gears, and means selectively establishing a connection between the ring gear and the sun gear meshing with the first set of planet gears on the said second carrier so as to prevent rotation of such sun gear.

14. A transmission interconnecting driving and driven shafts comprising a fluid unit having driving, driven and reactor members, an operative connection between said driving shaft and said driving member, a differential gearing providing a first planet carrier drivingly attached to said driven shaft, a first and a second set of planet gears intermeshing and carried on said first planet carrier, a second planet carrier drivingly attached to said fluid driven member, a first and a second set of planet gears intermeshing and carried on said second planet carrier, a gear train drivingly interconnecting the said second sets of planet gears on said first and second planet carriers, a third set of planet gears attached to and rotatable with said first set of planet gears on said first planet carrier, a ring gear meshing with said third set of planet gears, a first sun gear meshing with the said first set of planet gears on said first carrier, means connecting the ring gear to said sun gear, means including clutch means selectively drivingly connecting the said first sun gear with the first set of planet gears on said second planet carrier and permitting selectively free rotation of the said first sun gear, braking means selectively engaging the ring gear to prevent rotation, a third set of planet gears attached to and rotatable with the said first set of planet gears on said second carrier, a second sun gear drivingly attached to said reactor member and meshing with said third set of planet gears on said second carrier, and a one-way brake operatively connected to said reactor member to prevent rotation of said reactor member in one direction.

15. A transmisison interconnecting driving and driven shafts comprising a fluid unit having driving, driven and reactor members, an operative connection between said driving shaft and said fluid driving member, a differential gearing providing a first planet carrier drivingly attached to said driven shaft, a first and a second set of planet gears intermeshing and carried on said first planet carrier, a second planet carrier drivingly attached to said fluid driven member, a first and a second set of planet gears intermeshing and carried on said second planet carrier, a first sun gear meshing with the said first set of planet gears on said first carrier, a second sun gear meshing with the first set of planet gears on said second carrier, clutch means selectively connecting said first and second sun gears, a third set of planet gears attached to and rotatable with the said first set of planet gears on said first carrier, a ring gear meshing with said third set of planet gears, means selectively establishing a connection between the ring gear and the said first sun gear so as to prevent rotation of said first sun gear, a third sun gear meshing with the said second set of planet gears on the said first planet carrier, a fourth sun gear meshing with the said second set of planet gears on the said second planet carrier, means drive connecting said third and fourth sun gears, a third set of planet gears attached to and rotatable with the said first set of planet gears on said second carrier, a fifth sun gear drivingly attached to said reactor member and meshing with said third set of planet gears on said second carrier, and a one-way brake operatively connected to said fifth sun gear and reactor member to prevent rotation of said reactor member in one direction.

16. A transmission interconnecting driving and driven shafts comprising a fluid unit having driving, driven and reactor members, an operative connection between said driving shaft and said driving member, a differential gearing providing a first planet carrier drive connected to said driven shaft, a second planet carrier connected to said fluid driven member, a set of planet gears carried by each planet carrier, means including a gear train operatively connecting the set of planet gears on the first planet carrier to the set of planet gears on the second planet carrier, means drivingly connected to and rotatable in the same direction as the set of planet gears on each carrier, a shaft drivingly interconnecting said means, another set of planet gears attached to and rotatable with the set of planet gears on said second carrier, a sun gear drivingly attached to said reactor member and meshing with the last said set of planet gears on said second carrier, and a one-way brake operatively connected to said reactor member to prevent rotation of said reactor member and said sun gear in one direction.

References Cited in the file of this patent
UNITED STATES PATENTS
2,892,363     Dodge _____ June 30, 1959